United States Patent
Terry et al.

(10) Patent No.: US 10,417,395 B2
(45) Date of Patent: Sep. 17, 2019

(54) APPLICATION USAGE ANALYTICS FOR LICENSING ANALYSIS

(71) Applicant: ServiceNow, Inc., Santa Clara, CA (US)

(72) Inventors: David Terry, San Jose, CA (US); James Owen, Cupertino, CA (US); Arjun Badarinath, San Jose, CA (US); Vardhini Shankaranarayanan, Union City, CA (US); Kashyap Ivaturi, Dubin, CA (US)

(73) Assignee: ServiceNow, Inc., Santa Clara, CA (US)

( * ) Notice: Subject to any disclaimer, the term of this patent is extended or adjusted under 35 U.S.C. 154(b) by 129 days.

(21) Appl. No.: 15/484,924

(22) Filed: Apr. 11, 2017

(65) Prior Publication Data

US 2017/0308685 A1   Oct. 26, 2017

Related U.S. Application Data

(60) Provisional application No. 62/325,738, filed on Apr. 21, 2016.

(51) Int. Cl.
*G06F 17/00* (2019.01)
*H04L 29/06* (2006.01)
(Continued)

(52) U.S. Cl.
CPC ............ *G06F 21/105* (2013.01); *G06F 21/52* (2013.01); *G06F 2221/033* (2013.01); *G06F 2221/0775* (2013.01)

(58) Field of Classification Search
CPC .............................. G06F 21/105; G06F 21/52
(Continued)

(56) References Cited

U.S. PATENT DOCUMENTS

2008/0209503 A1    8/2008   Hess et al.
2011/0289003 A1*  11/2011   Womack ................. G06F 21/10
                                                                    705/59
(Continued)

FOREIGN PATENT DOCUMENTS

WO          97/30575 A2     8/1997

OTHER PUBLICATIONS

ServiceNow, "Subscription Usage", Latest version: Feb. 6, 2015, Downloaded Mar. 31, 2017, https://web.archive.org/web/20150226091344/http:/wiki.servicenow.com/index.php?title=Subscription_Usage,3 pp.
(Continued)

*Primary Examiner* — Anthony D Brown
*Assistant Examiner* — Samuel Ambaye
(74) *Attorney, Agent, or Firm* — Fletcher Yoder PC

(57) ABSTRACT

A system and method for performing licensing monitoring and compliance within a service provider platform are provided. The system comprises a memory and a processor configured to execute instructions stored within the memory. The system further comprises a central instance that executes on the processor and comprises a license repository containing licensing data for application components. The system further comprises a customer instance that includes a third-party application component installed within the customer instance from an application store. The system further includes a licensing module. The third-party application component is switchable between a monitor mode in which the licensing module reports usage of the third-party application component to the central instance and an enforcement mode in which the usage is controlled on the customer instance based on the license repository.

20 Claims, 11 Drawing Sheets

(51) Int. Cl.
    *G06F 21/10*     (2013.01)
    *G06F 21/52*     (2013.01)

(58) Field of Classification Search
    USPC .............................................................. 726/1
    See application file for complete search history.

(56) References Cited

U.S. PATENT DOCUMENTS

| | | |
|---|---|---|
| 2014/0165053 A1 | 6/2014 | Escobar-Olmos et al. |
| 2016/0112497 A1* | 4/2016 | Koushik ................. H04L 67/10 726/7 |

OTHER PUBLICATIONS

International Search Report and Written Opinion for PCT Application No. PCT/US2017/028629 dated Jul. 5, 2017; 12 pgs.

\* cited by examiner

| ☰ Subscriptions (Subscriptions) | | New | Name ▼ | | | | Grid Split | | | |
|---|---|---|---|---|---|---|---|---|---|---|
| ▽ All | | | | Search | | | | | | |
| 🔍 | | 605 | 610 | 615 | 620 | 625 | 630 | 635 | 640 | |
| ☐ | | ≡ Name ▼ | ≡ Type | ≡ Category | ≡ Start date | ≡ End date | ≡ Purchased | ≡ Allocated | ≡ Display only | |
| ☐ | ⓘ | Domain Separation For Non-MSP Customers.... | Per-User | ServiceNow | 2015-12-20 | 2018-12-19 | 0 | 0 | true | |
| ☐ | ⓘ | ITSA Unlimited - Fulfiller User | Per-User | ServiceNow | 2015-12-20 | 2018-12-19 | 55 | 0 | false | |

Related Links
Notification Preferences
View Subscriptions

| Roles (6) | Groups (7) | Delegates | Subscriptions (16) |

≡ Subscriptions ▽ — *16 is the number of subscribed apps*

▽ | for text | Search

≡ Subscriptions

▽ Applications

| ☐ | ≡ Subscription ▽ | ≡ Subscription Application |
|---|---|---|
| ☐ ⓘ | ITSA Unlimited - Fulfiller User | Change Management |
| ☐ ⓘ | ITSA Unlimited - Fulfiller User | Release Management |
| ☐ ⓘ | ITSA Unlimited - Fulfiller User | Field Service Automation |
| ☐ ⓘ | ITSA Unlimited - Fulfiller User | SDLC - SCRUM |
| ☐ ⓘ | ITSA Unlimited - Fulfiller User | IT Governance, Risk and Compliance (ITGRC) |
| ☐ ⓘ | ITSA Unlimited - Fulfiller User | IT Cost Management |
| ☐ ⓘ | ITSA Unlimited - Fulfiller User | All CreateNow Apps |
| ☐ ⓘ | ITSA Unlimited - Fulfiller User | Problem Management |

APPLICATION USAGE ANALYTICS FOR LICENSING ANALYSIS

CROSS REFERENCE TO RELATED APPLICATIONS

The present application claims the benefit of U.S. Provisional Application No. 62/325,738, filed Apr. 21, 2016, entitled, "Application Usage Analytics for Licensing Analysis," herein incorporated by reference.

TECHNICAL FIELD

The present disclosure relates in general to techniques and devices for application usage analytics for licensing analysis.

BACKGROUND

A service provider can provide cloud computing services to customers using, for example, a single-tenant environment where a separate instance can be created per customer. An instance can include, for example, application node(s) and database node(s). An instance can execute platform software which permits the operation of or access to applications configured or created within the platform. For example, one such application might be an ITSM application. Another such application might be an HR application. Plugins can also be used to enable, disable, add, or remove content or functionality available to or within the platform software.

SUMMARY

Disclosed herein are aspects of systems and methods for application usage analytics for licensing analysis.

In an implementation, a system for performing licensing monitoring and compliance within a service provider platform is provided. The system comprises a memory and a processor configured to execute instructions stored within the memory. The system further comprises a central instance that executes on the processor and comprises a license repository containing licensing data for application components. The system further comprises a customer instance that includes a third-party application component installed within the customer instance from an application store. The system further includes a licensing module. The third-party application component is switchable between a monitor mode in which the licensing module reports usage of the third-party application component to the central instance and an enforcement mode in which the usage is controlled on the customer instance based on the license repository.

In an implementation, a method for performing licensing monitoring and compliance within a service provider platform is provided. The method comprises installing a third-party application component within a customer instance from an application store and reporting, via a licensing module of the customer instance, usage of the third-party application component to a central instance when the third-party application component is in a monitor mode. The method further includes switching, via the third-party application component, between the monitor mode and an enforcement mode that controls the usage of the third-party application component on the customer instance based on a license repository of the central instance.

In an implementation, a non-transitory computer readable medium for performing licensing monitoring and compliance within a service provider platform is provided. The non-transitory computer readable medium includes executable instructions that, when executed by a processor, facilitate performance of operations, comprising installing a third-party application component within a customer instance from an application store and reporting, via a licensing module of the customer instance, usage of the third-party application component to a central instance when the third-party application component is in a monitor mode. The operations further include switching, via the third-party application component, between the monitor mode and an enforcement mode that controls the usage of the third-party application component on the customer instance based on a license repository of the central instance.

These and other implementations of the present disclosure are disclosed in the following detailed description, the appended claims, and the accompanying figures.

BRIEF DESCRIPTION OF THE DRAWINGS

The description herein makes reference to the accompanying drawings wherein like reference numerals refer to like parts throughout the several views.

FIG. 6A is a screen shot illustrating a license management user interface (UI) in accordance with implementations of this disclosure.

FIG. 7 is a screen shot illustrating a display for creating a user set in accordance with implementations of this disclosure.

FIG. 8 is a screen shot illustrating a display for license status availability from user records in accordance with implementations of this disclosure.

DETAILED DESCRIPTION

The availability of or usage of applications, plugins, content, or functionality can require certain licensing or permissions from the creator or owner of such applications, plugins, content, or functionality. Licenses can include, for example, making available certain applications or functionality on the instances or permitting a number of users or connections to an application or functionality or access to resources, such as a number of application nodes.

A service provider may allow different customers to run application components in instances that may not be accessible to cloud management infrastructure. For example, a service provider may not permit components outside an instance to directly access data or functionality within an instance. This can impact the ability of the service provider to verify that execution of the application components by customer users conform with application licensing, for example, when the applications are developed by third parties. Licenses can be configured in different ways. For example, one type of license is a subscription which can be a license for a particular number of users, which can expire after a certain term, or a combination thereof.

A licensing component may be installed within an instance for the customer that collects application usage information and compares it against licensing information. Depending on the implementation, the comparison can be performed by or within the instance, or can be performed in a central management instance after selected usage information is transmitted to the central management instance. As this licensing component is installed within the instance, compliance can be monitored and verified while maintaining a level of security provided by the instance.

Implementations of this disclosure provide technological improvements particular to computer networks, for example, those concerning monitoring licensing and compliance configurations within a service provider platform and computing network. Computer network-specific technological problems, such as the inability of service providers to verify that the execution and/or usage of application components by users confirm with licensing requirements, can be wholly or partially solved by implementations of this disclosure. For example, by including a licensing module within customer instances utilized by customers, the licensing module of the service provider can monitor usage of a third-party application component within the customer instances and can report the usage to a licensing environment within a central instance of the service provider. Furthermore, the usage within the customer instance can be controlled by the service provider accessing or using a licensing database or license repository of the central instance (or of the licensing environment of the central instance).

Figure 1:
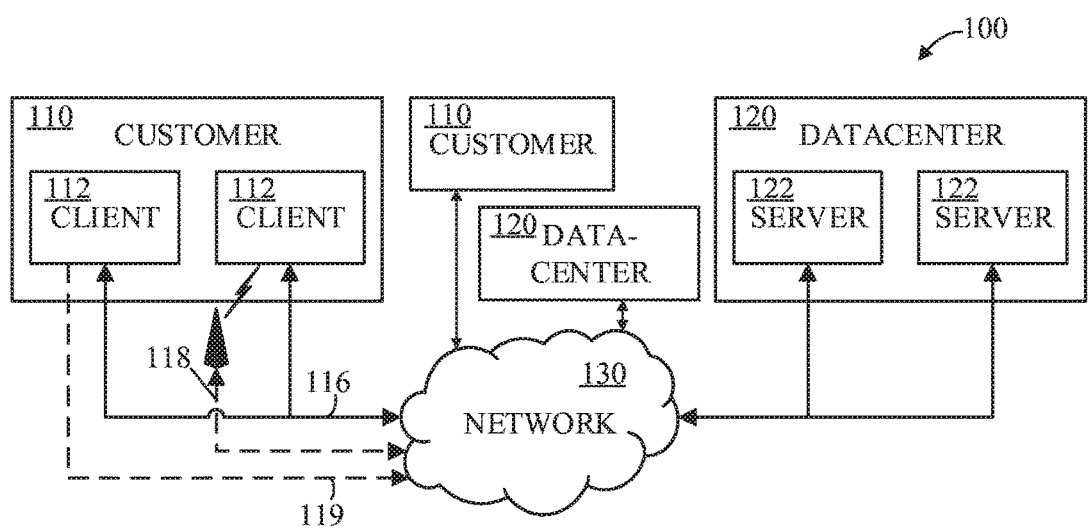
FIG. 1 is a block diagram illustrating an example distributed or cloud computing system.

To describe some implementations in greater detail, reference is first made to examples of hardware structures and interconnections usable in implementations of the present disclosure. FIG. 1 is a block diagram of an example distributed or cloud computing system 100 in accordance with implementations of this disclosure. Use of the phrase "cloud computing system" herein is a proxy for any form of a distributed computing system, and this phrase is used simply for ease of reference. The cloud computing system 100 can have any number of customers, including customer 110. Each customer 110 may have clients, such as clients 112. Each of the clients 112 can be in the form of a computing system including multiple computing devices, or in the form of a single computing device, for example, a mobile phone, a tablet computer, a laptop computer, a notebook computer, a desktop computer, and the like. The customer 110 and the clients 112 are examples only, and a cloud computing system, such as the cloud computing system 100, may have a different number of customers or clients or may have a different configuration of customers or clients. For example, there may be hundreds or thousands of customers and each customer may have any number of clients.

The cloud computing system 100 can include any number of datacenters, including datacenter 120. Each datacenter 120 may have servers, such as servers 122. Each datacenter 120 may represent a facility in a different geographic location where servers are located. Each of the servers 122 can be in the form of a computing system including multiple computing devices, or in the form of a single computing device, for example, a desktop computer, a server computer and the like. The datacenter 120 and the servers 122 are examples only, and a cloud computing system, such as the cloud computing system 100, may have a different number of datacenters and servers or may have a different configuration of datacenters and servers. For example, there may be tens of datacenters and each datacenter may have hundreds or any number of servers.

The clients 112 and the servers 122 may be configured to connect to network 130. The clients for a particular customer may connect to the network 130 via a common connection point 116 or different connection points, including but not limited to a wireless connection point 118 and a wired connection point 119. Any combination of common or different connections points may be present, and any combination of wired and wireless connection points may be present as well. The network 130 can be, for example, the Internet. The network 130 can also be or include a local area network (LAN), wide area network (WAN), virtual private network (VPN), or any other means of transferring data between any of the clients 112 and the servers 122. The network 130, datacenter 120 and/or blocks not shown may include network hardware such as routers, switches, load balancers and/or other network devices.

Other implementations of the cloud computing system 100 are also possible. For example, devices other than the clients and servers shown may be included in the cloud computing system 100. In some implementations, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as the servers 122.

Figure 2:
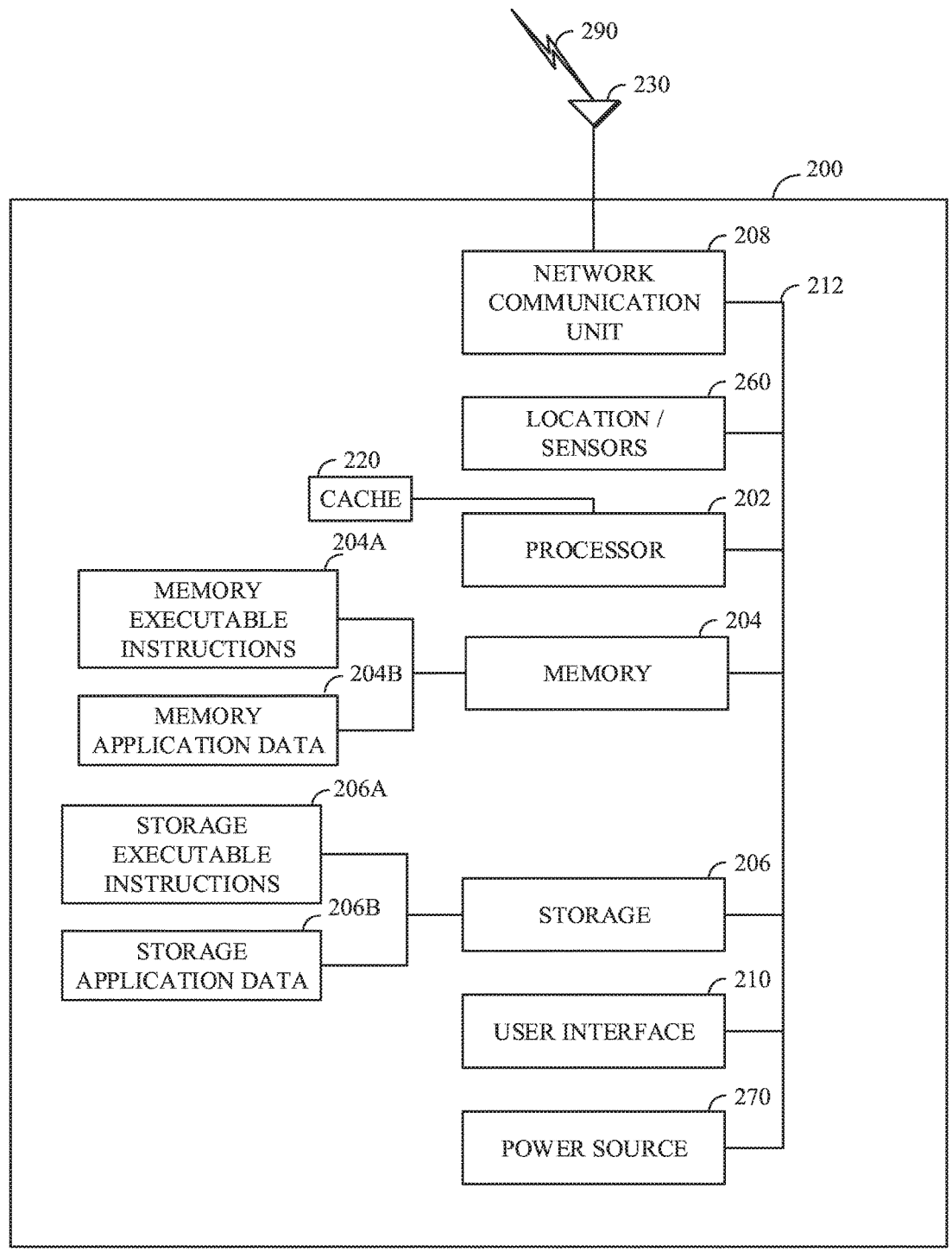
FIG. 2 is a block diagram illustrating an example of an internal configuration of a computing device, such as a computing device of the computing system as shown in FIG. 1.

FIG. 2 is a block diagram illustrating an example of an internal configuration of a computing device 200, such as a computing device of the computing system as shown in FIG. 1. The computing device 200 can be one of the clients 112 or one of the servers 122 of the cloud computing system 100 as shown in FIG. 1, including an infrastructure control server, of a computing system. As previously described, the clients 112 or the servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. A CPU (or processor) 202 can be a central processing unit, such as a microprocessor, and can include single or multiple processors, each having single or multiple processing cores. Alternatively, the CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of the CPU 202 can be distributed across multiple machines that can be coupled directly or across a local area or other network. The CPU 202 can be a general purpose processor or a special purpose processor.

A Random Access Memory (RAM) 204 can be any suitable non-permanent storage device that is used as memory. The RAM 204 can include executable instructions and data for access by the CPU 202. The RAM 204 typically comprises one or more DRAM modules such as DDR SDRAM. Alternatively, the RAM 204 can include another type of device, or multiple devices, capable of storing data for processing by the CPU 202 now-existing or hereafter developed. The CPU 202 can access and manipulate data in the RAM 204 via a bus 212. The CPU 202 may utilize a cache 220 as a form of localized fast memory for operating on data and instructions.

A storage device 206 can be in the form of read only memory (ROM), a disk drive, a solid state drive, flash memory, Phase-Change Memory (PCM), or any form of non-volatile memory designed to maintain data for some duration of time, and preferably in the event of a power loss. The storage device 206 can include executable instructions 206A and application files/data 206B along with other data. The executable instructions 206A can include, for example, an operating system and one or more application programs for loading in whole or part into the RAM 204 (with RAM-based executable instructions 204A and application files/data 204B) and to be executed by the CPU 202. The executable instructions 206A may be organized into programmable modules or algorithms, functional programs, codes, and code segments designed to perform various functions described herein. The operating system can be, for example, a Microsoft Windows®, Mac OS X®, or Linux® operating system, or can be an operating system for a small device, such as a smart phone or tablet device, or a large device, such as a mainframe computer. The application program can include, for example, a web browser, web server and/or database server. The application files 206B can, for example, include user files, database catalogs and configuration information. In some implementations, the storage device 206 includes instructions to perform the discovery techniques described herein. The storage device 206 may comprise one or multiple devices and may utilize one or more types of storage, such as solid state or magnetic.

The computing device 200 can also include one or more input/output devices, such as a network communication unit 208 and an interface 230 that may have a wired communication component or a wireless communications component 290, which can be coupled to the CPU 202 via the bus 212. The network communication unit 208 can utilized any of a variety of standardized network protocols, such as Ethernet, TCP/IP, or the like to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to the user interface 210. When the output device is or includes a display, the display can be implemented in various ways, including by a liquid crystal display (LCD) or a cathode-ray tube (CRT) or light emitting diode (LED) display, such as an OLED display.

Other implementations of the internal configuration or architecture of the computing device 200 are also possible. For example, the computing device 200 may omit the user interface 210. The RAM 204 or the storage device 206 can be distributed across multiple machines such as network-based memory or memory in multiple machines performing the operations of clients or servers. Although depicted here as a single bus, the bus 212 can be composed of multiple buses, that may be connected to each other through various bridges, controllers, and/or adapters. The computing device 200 may contain any number of sensors and detectors that monitor the computing device 200 itself or the environment around the computing device 200, or it may contain a location identification unit 260, such as a GPS or other type of location device. The computing device 200 may also contain a power source 270, such as a battery, so that the unit can operate in a self-contained manner. These devices may communicate with the CPU/processor 202 via the bus 212.

Figure 3:
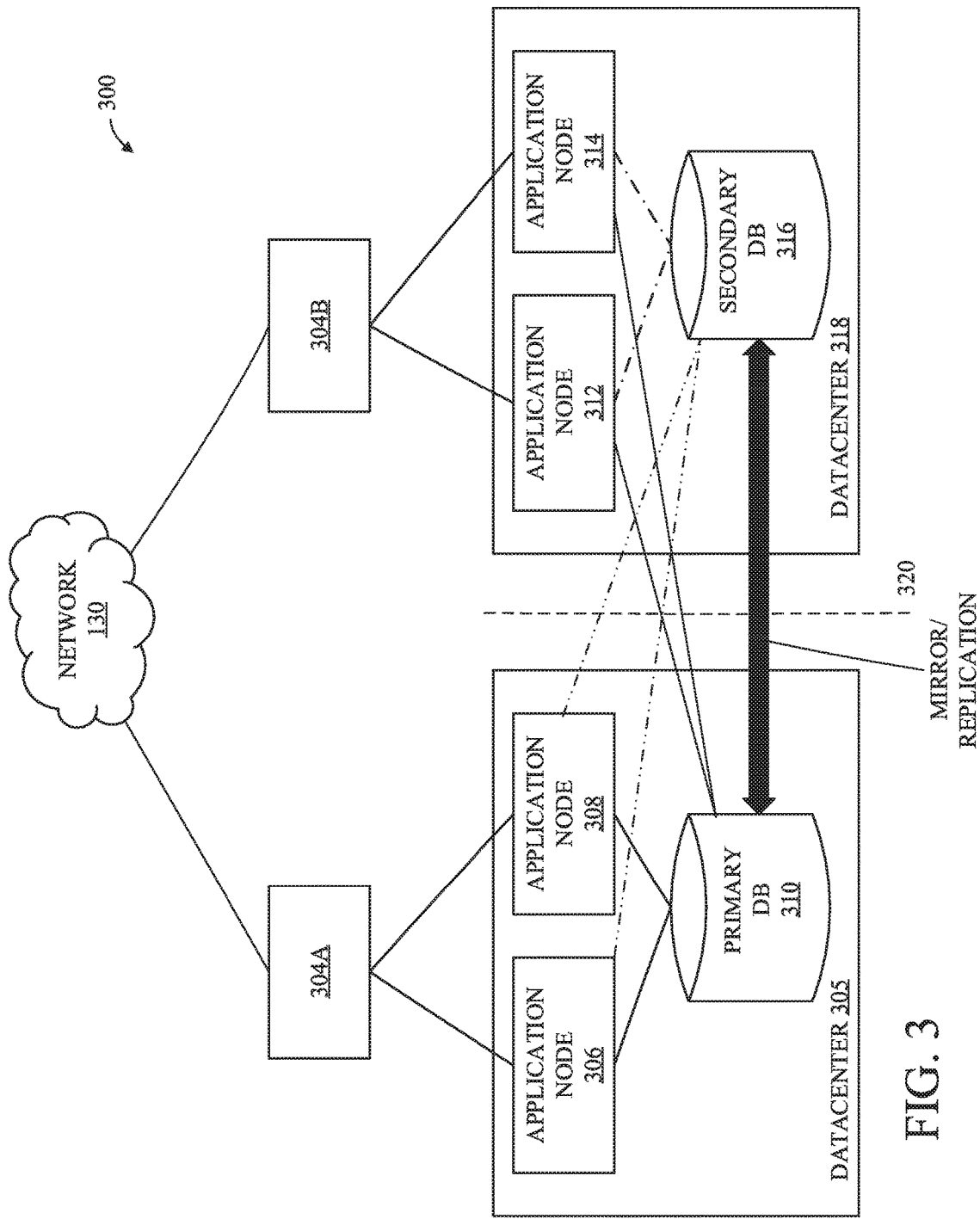
FIG. 3 is a block diagram illustrating an example distributed computing system in accordance with implementations of this disclosure.

FIG. 3 is a block diagram illustrating an example distributed computing system 300 in accordance with implementations of this disclosure. The distributed computing system 300 can be a high availability processing system. In some implementations, the distributed computing system 300 can include the datacenter 120 and the network 130 of FIG. 1. Broadly, the distributed computing system 300 includes load balancers 304A-304B and two datacenters 305, 318 (similar to the datacenter 120 of FIG. 1). The load balancers 304A-304B are coupled to a telecommunications network graphically depicted by network 130. The load balancers 304A-304B may also include reverse proxy load balancers.

The datacenter 305 includes a primary database 310, and the datacenter 318 includes a secondary database 316. The datacenters 305, 318 operate in such a manner that the secondary database 316 can provide an exact or substantially exact mirror of the primary database 310. A line 320 is used to graphically emphasize the logical boundary between the datacenters 305 and 318. Depending upon the intended application, the primary and secondary databases 310, 316 may be implemented using, for example, a relational database management system (RDBMS), an object database, an XML database, flat files, or the like.

Each datacenter 305, 318 can include two application nodes (such as application nodes 306, 308 in datacenter 305, and application nodes 312, 314 in datacenter 318), although a greater or lesser number can be used depending on the implementation. The application nodes 306, 308, 312, 314 can be implemented using processing threads, virtual machine instantiations, or other computing features of the datacenters that run programs on behalf of remotely sited clients, and exchange related data with such clients via the network 130. In connection with running these programs, occasions arise for the application nodes 306, 308, 312, 314 to store and retrieve data, with the primary and secondary databases 310 and 316 filling this role. In some implementations, each of the application nodes 306, 308, 312, 314 connects to a single primary database (such as the primary database 310), regardless of whether said database is located in the same datacenter as said application node. For example, a primary database may be read/write and a secondary database may be configured to be read-only such that it mirrors changes from the primary database. Requests to the distributed computing system 300 may be routed to the application nodes in the datacenter of the primary database first, followed by the other datacenter. In a failover situation, the secondary database may become read/write with the formerly primary database switched to mirror the secondary database (which becomes the primary database). In this situation, each application node can be reconfigured to point to the secondary database (now the primary database) as shown by the dashed lines.

As mentioned above, each datacenter 305, 318 may have its own load balancer 304A-304B. Each load balancer may be configured to direct traffic to respective servers and processing nodes located within its datacenter. In regard to proxy services, in one example, the load balancers 304A-304B are configured to provide a single Internet-delivered service to remote clients via the network 130, where this service is actually provided by a server farm composed of the computerized servers of the datacenters 305, 318. The components 304A-304B also coordinate requests from remote clients to the datacenters 305, 318, simplifying client access by masking the internal configuration of the datacenters. The load balancer components 304A-304B may serve these functions by directing clients to processing nodes as configured directly or via DNS. The load balancer 304A-304B can be configured for sticky sessions. With sticky sessions, requests from a client can be forwarded to the same application node 306, 308 for the duration of the client session.

In regard to load balancing, the load balancer components 304A-304B can be configured to direct traffic to the secondary datacenter 318 in the event the primary datacenter 305 experiences one of many enumerated conditions predefined as failure. The load balancing functionality of the load balancer components 304A-304B can be provided as separate components or as a single component.

Figure 4:
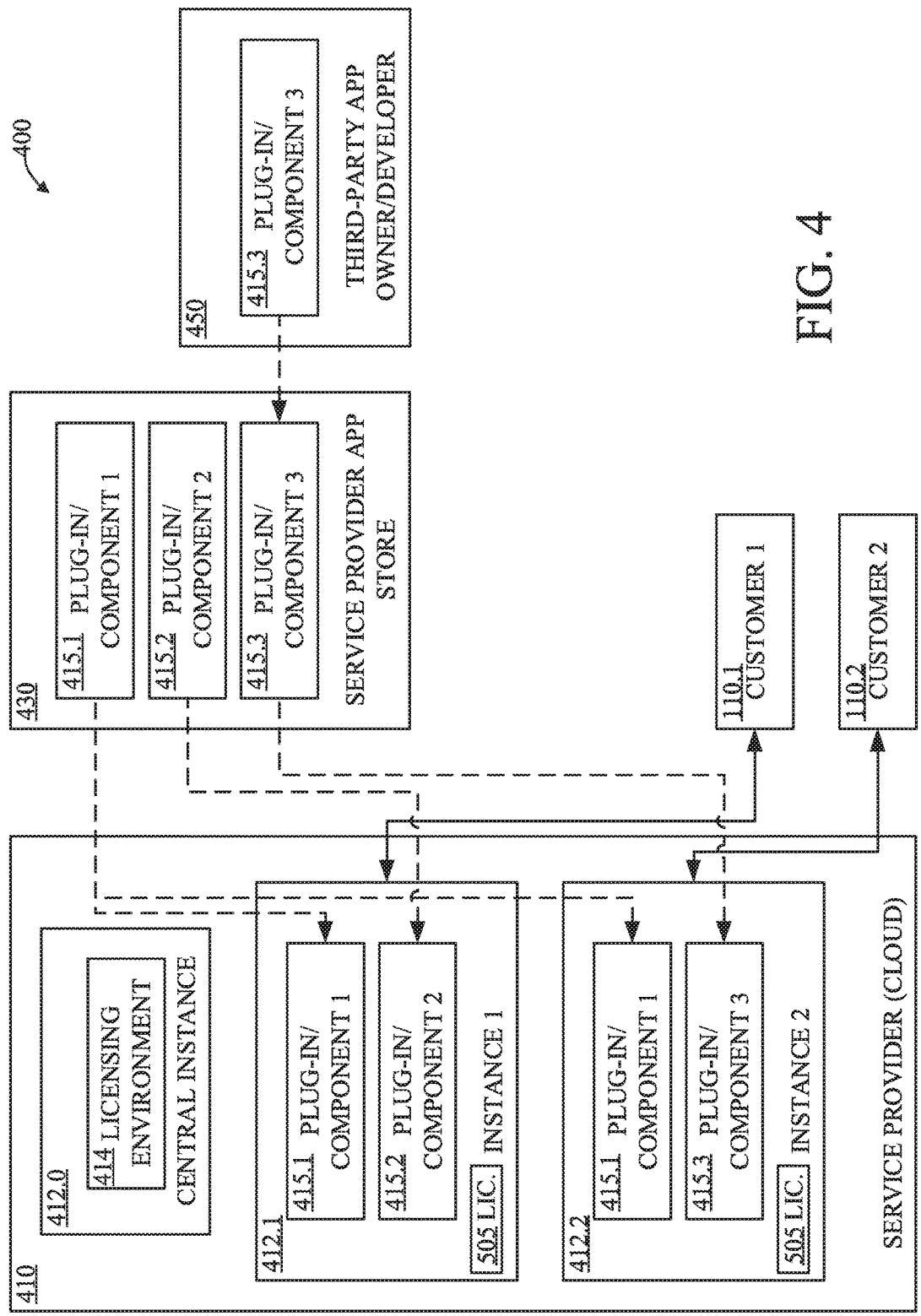
FIG. 4 is a block diagram illustrating an infrastructure with a service provider (cloud) that hosts instances of applications for customers in accordance implementations of this disclosure.

FIG. 4 is block diagram illustrating an infrastructure 400 with a service provider (cloud) 410 that hosts instances of applications for customers in accordance implementations of this disclosure. The service provider (cloud) can be referred to as a service provider platform or infrastructure. The service provider (cloud) 410 can run a number of instances, including a central instance 412.0 that provides functionality relating to the management of other instances, a first instance 412.1 that is used by a first customer 110.1 (such as the customer 110 of FIG. 1), and a second instance 412.2 that is used by a second customer 110.2 (such as the customer 110 of FIG. 1). The first and second instances 412.1 and 412.2 can be referred to as customer instances. In some implementations, each of the instances 412.1 and 412.2 are assigned to a single customer 110 thus providing the ability to customize the software running on and the plugins/licensed components used on the instances 412.1 and 412.2. The elements shown in FIG. 3 (besides the network 130) may belong to any of the instances 412.0, 412.1, 412.2.

In some implementations, the service provider (cloud) 410 is a single-tenant cloud environment that permits, for example, the installation and operation of applications 415 in instances such as instances 412.1 and 412.2. The applications 415 can also be referred to as plug-ins or components. A single-tenant cloud environment includes implementations where an instance can be provisioned to a single customer and a database used by the instance can include data only for that customer. In multi-tenant cloud environments, customers may share an instance and data for multiple customers can be shared in a database used by the instance. A single-tenant environment can be more secure because, for example, access to the instance can be limited to a single customer. A single-tenant instance can be more configurable because, for example, scripts, applications, plugins, and platform software can be provided to a single customer and thus can be customized to that customer's needs without affecting other customers.

As illustrated in FIG. 4, the first instance 412.1 has a first plug-in/component 415.1 and a second plug-in/component 415.2. The second instance 412.2 has the first plug-in/component 415.1 and a third plug-in/component 415.3. Although the two instances 412.1, 412.2 have the first plug-in/component 415.1 in common, these components are separately installed and executed within two separate instances. The plug-ins/components or applications 415 can include scoped applications (i.e., applications that provide for which of their resources are available to other parts of the system) such as the plug-in/component 415.3 provided by a third party application owner/developer 450 and provisioned through a service provider application store 430 (also referred to as an application store or an app store). Plug-in/components such as plug-in/component 415.3 may be referred to as a third-party application component.

Although the service provider (cloud) 410 may have administrative access to one or more of the instances 412.0, 412.1, 412.2 (and other instances not listed), general access by the service provider (cloud) 410 to any of the one or more instances 412.0, 412.1, 412.2 can be restricted. Such restrictions can make determining compliance with licensing requirements difficult without an implementation of a licensing system/framework including but not limited to a licensing system/framework 500 as further described in FIG. 5. The licensing system/framework can include but is not limited to a licensing environment 414 within the central instance 412.0 and a licensing module 505 within each of the instances 412.1 and 412.2. Because the instances 412.0, 412.1, 412.2 may be designed to not be directly accessible from the remainder of the service provider (cloud) 410, it can be difficult to collect usage information or enforce licensing.

The licensing system/framework can permit switchable monitoring mode and enforcement mode capabilities associated with usage of the third-party application (which is monitored via the monitoring mode and controlled via the enforcement mode), which is beneficial in a case of hosting third-party applications (such as the plug-in/component 415.3) where the third-party application owner/developer 450 has limited access to any of the instances 412.0, 412.1, 412.2. The licensing environment 414 within the central instance 412.0 can include a license/audit repository that contains or includes licensing data for application components or third-party applications. The license/audit repository can also be referred to as a licensing database. In the enforcement mode, the usage of the third-party application is controlled on the customer instance (such as the instances 412.1 and 412.2) based on the licensing database. For example, the enforcement mode can include using the licensing database to determine whether usage of a third-party application or content or functionality thereof is permitted and to control access or use based on that determination.

The service provider application store 430 can permit users to purchase third-party content or functionality, such as scoped applications (e.g., plug-in/component 415.3) from the third-party application owner/developer 450. The scoped applications can be deployed to the instance 412 by the service provider (cloud) 410 upon purchase.

However, there may be licensing requirements imposed on the customer after purchase (e.g., for a freemium product or for a product that is licensed by the user). In implementations where third parties do not have direct access to a customer instance, third-party developers (such as the third-party application owner/developer 450) need a tool to monitor and enforce licensing compliance. Thus, according to some implementations, the licensing module 505 may be provided within each of the instances 412.1 and 412.2 (i.e., one licensing module 505 in instance 412.1 and another in instance 412.2) that can, in the monitoring mode (i.e., when the application components are switched to the monitoring mode), monitor customer usage of application components to determine compliance with the licensing information stored in a database of the service provider (cloud) 410 (such as the license repository or licensing database stored within or coupled to the licensing environment 414 of the central instance 412.0).

For security reasons, the licensing module 505 and corresponding/integrated interface may push usage information from the instances 412.1 and 412.2, meaning that the usage information is pushed out of the instances 412.1 and 412.2 by software running within it instead of, for example, the central instance 412.0 directly accessing usage information within the instances 412.1 and 412.2. This information can then be accessed by a third-party (e.g., the third party application owner/developer 450) who developed, owns, or has some other interest or relationship in the third-party content. As used herein, the terms "third-party developer" and "third-party owner" include anyone who has control over or other type of interest in managing or controlling use of the application.

Figure 5:
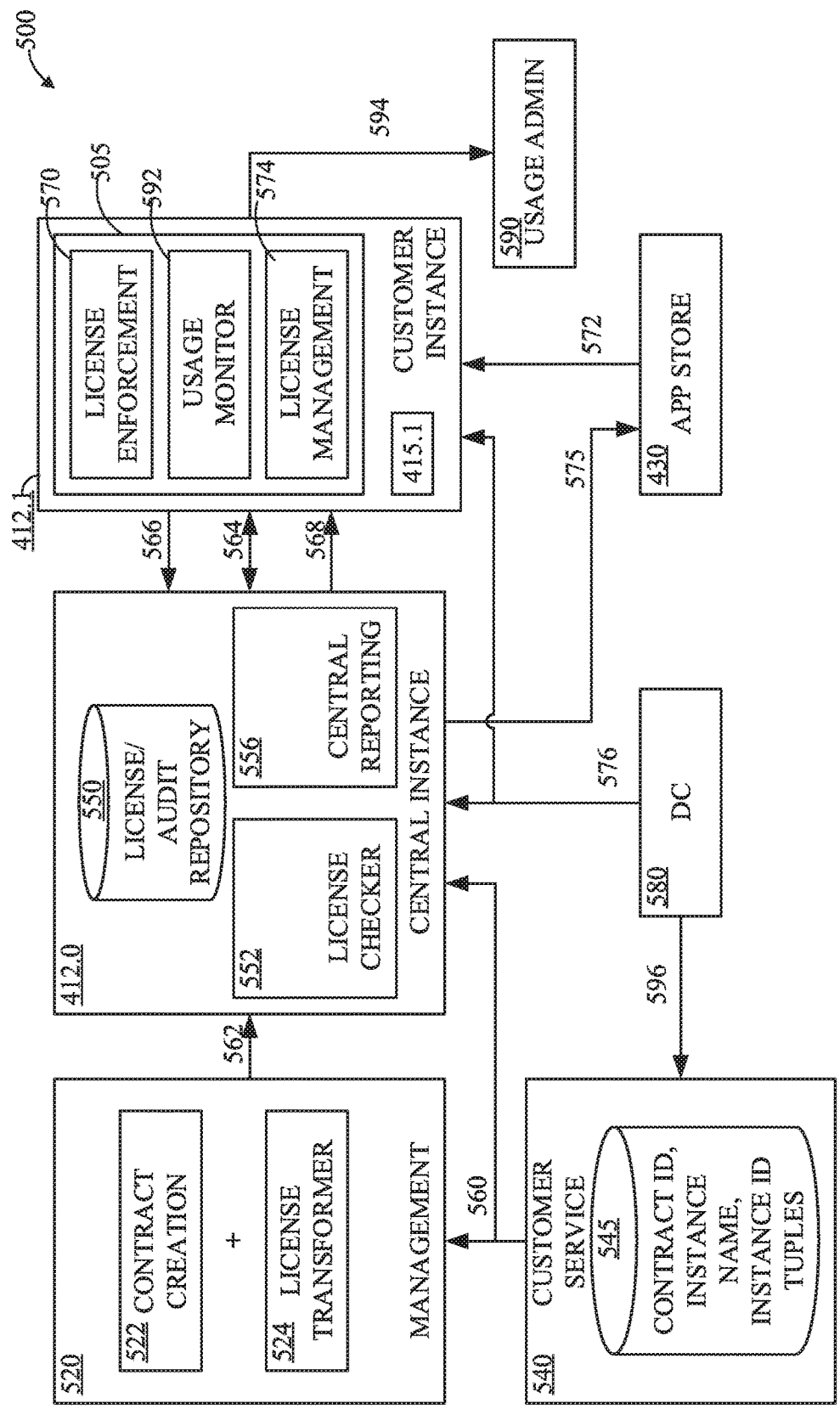
FIG. 5 is a block diagram illustrating a licensing system/framework in accordance with implementations of this disclosure.

FIG. 5 is a block diagram illustrating a licensing system/framework 500 in accordance with implementations of this disclosure. The licensing system/framework 500 provides a subscription management mechanism for licensing and usage analytics. In some implementations, the licensing system/framework 500 provides a user interface (UI), table-based license tracking, an ability to organize users into user sets, and an enforcement feature that, in the enforcement mode, can be used to enforce the license. The enforcement feature can be utilized in conjunction with a licensing database to enforce the license.

A management module 520 of the licensing system/framework 500 comprises a contract creation module 522 that contains utilities for creating licensing contracts between customers and the application provider and a license transformer module 524 that allows licenses to be transformed based on user need. In some implementations, the management module 520 can include an API to permit the creation of a stock keeping unit (SKU) when a new third-party or other application is created or published to an application store such as the application store 430 of FIG. 4. Once a SKU is created, the contract creation module 522 can be used to create a contract for the SKU after a purchase by a customer of that SKU. The contract can be created automatically upon purchase or can be included in a process with manual (e.g., approval) steps.

Once a contract is created, a license (such as a license 562) can be generated for that contract, for example, by the license transformer module 524, and then deployed, for example, to the central or customer instance (such as the instances 412.0, 412.1, 412.2 of FIG. 4 or the central instance 412.0 and the customer instance 412.1 of FIG. 5). Instance metadata 560 can be provided to the management module 520 from a customer service module 540 which may contain contract data 545 that is utilized by the contract creation module 520 to create the contract. The contract data 545 can include but is not limited to a contract ID, party information, terms, instance name, and instance ID tuples.

The management module 520 can pass the license 562 and other licenses to a central instance (such as the central instance 412.0) where they can be stored in a license/audit repository 550 (i.e., a licensing database). A license checker module 552 can check that the licenses are valid and can determine whether a customer instance (such as the customer instance 412.1) is in compliance with licensing requirements. The license checker module 552 can be implemented using a scripted-based module that reviews collected usage records uploaded from the customer instance. After review, the collected usage records can be tagged as being in-policy or out-of-policy use based on defined use policies. Use policies can be dynamically modified or added during module or third-party application component operation. A central reporting module 556 can provide information about the licensing usage and compliance of the customer instance 412.1. In some implementations, the licensing environment 414 of FIG. 4 can refer to the combination of the license checker module 552, the license/audit repository 550, and the central reporting module 556, additional modules, and any combination thereof.

The central instance 412.0 can transmit activity status 568 to the customer instance 412.1, and the central instance 412.0 and the customer instance 412.1 can share the license information. In some implementations, the tags of in-policy or out-of-policy can be provided back to the customer instance 412.1 by way of the activity status 568. Monitoring events 566 can be sent from the customer instance 412.1 and to the central instance 412.0. The customer instance 412.1 can provide reports 594 to a usage administrator 590. The application store 430 can provide applications 572 (e.g., the first plug-in/component application 415.1 of FIG. 4) to the customer instance 412.1, and can receive information on application usage 575 from the central instance 412.0. The data center instance (DC) 580 can provide credentials 576 both to the central instance 412.0 and the customer instance 412.1 to permit the instances to access each other and to permit secure communication between the instances. The DC 580 can also provide provision/change results 596 to the customer service module 540. The DC 580 can be an instance operating platform software configured to provision other instances within a data center environment. In some implementations, the DC 580 can be configured, for example, to provision a central instance (such as the central instance 412.0) and/or a customer instance (such as the customer instance 412.1). In such an implementation, credentials for the central instance, customer instance, or a combination thereof can be provided during provisioning.

In some implementations, the customer service module 540, the management module 520, the DC 580, the app store 430 or a combination thereof can be implemented using instances operating platform software. For example, the customer service module 540 and the management module 520 can each be implemented as an application on separate instances. In an alternative implementation, multiple modules can be implemented as separate or combined applications on a single instance.

In some implementations of a license management lifecycle, the service provider (such as the server provider 410 of FIG. 4) can provide a list of licenses that are available to the customer (such as the customer 110 of FIG. 1). The customer can then specify the named holders of the licenses and adjust the lists of holders. Then, the customer can review trends, for example, on a monthly basis and use this for purposes of future planning.

A license management module 574 within the customer instance 412.1 can allow two methods of license allocation to accommodate both small and large clients. Users can be licensed using a direct user license or User Sets in which users may be grouped together. The User Sets can be modified to simplify the allocation of licenses in a dynamic environment. For example, User Sets (if set to synchronize license allocations) can be synchronized according to some time period (e.g., hourly, predetermined, dynamically changing, etc.) or on demand, permitting dynamically changing license allocations. For example, license holders can include all users from a given department or a certain grouping. When a new user is provisioned and added to the given department, that user can automatically become a license holder.

When an addition of one or more users would exceed license limits, the one or more users may be marked as pending (that could require action from a Usage Administrator such as the usage administrator 590 as a check and balance), which provides a way to determine when additional licenses are needed. License purchase limits can be enforced (in a self-policing mode), and particular users can be excluded from licenses. Related lists may be provided to show subscribed users, users in pending state, excluded users, and associated User Sets. These might typically be made available to a particular group of administrators, such as Enterprise Instance Administrators. Examples of what may be contained and displayed for a list of licenses include: type of license (per-user, capacity, etc.); start and end dates, quantities purchase (users, nodes, etc.), allocated slots (e.g., subscribed users, devices found, etc.), and display only status (which may be utilized for legacy SKUs or informational items).

FIG. 6A is a screen shot illustrating license (or subscription) management user interface (UI) 600 in accordance with implementations of this disclosure. The license management UI 600 may include controls associated with displaying license details and a list of subscribers or licensees. The license management UI 600 may include a username 605, a type of license 610 (such as per user, capacity, etc.), a category of the license 615 (e.g., a cloud-based service provider), start 620 and end 625 dates or times of the license, quantities purchased 630 (e.g., users, nodes, etc.), allocated slots for the licenses 635 (e.g., subscribed users, devices round, etc.) and whether the license has a display only status 640.

Figure 6B:
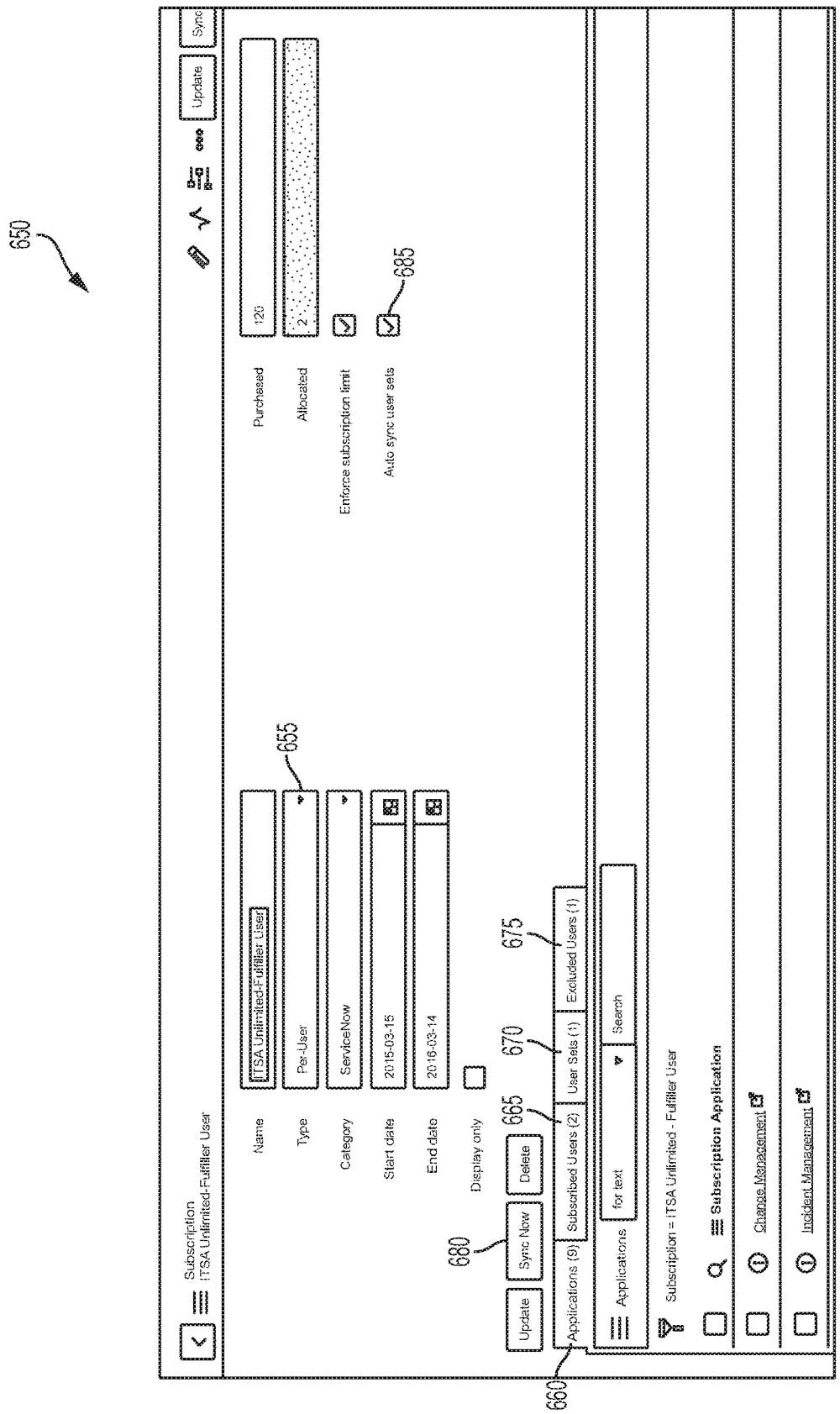
FIG. 6B is a screen shot illustrating a license management user interface (UI) in accordance with implementations of this disclosure.

FIG. 6B illustrates a screen shot of a license (or subscription) management user interface (UI) 650 in accordance with an implementation. The license management UI 650 may include controls associated with providing license details, such as providing: a place or data entry fields 655 to add a user (or multiple users at the same time) and user-related information (type, category, start/end dates, etc.) to a license, a tab 660 and associated data entry fields for displaying entitled applications associated with the user, a tab 665 and associated data entry fields for displaying subscribed users to an application, a tab 670 and associated data entry fields for displaying associated user sets, a tab 675 and associated data entry fields for displaying excluded users (i.e., users excluded from the licensing for a particular application), and a sync now button 680 that may appear if an auto sync box 685 is checked. Selection of the sync now button 680 forces a synchronization of the databases(s) and display. An update and delete buttons and additional tabs, associated data entry fields, and buttons may be provided as well.

In some implementations, the license management module 574 of FIG. 5 may utilize a table-based license tracking as the licensing information, which includes but is not limited to a number of tables, such as a table with a list of users and what they are subscribed to, a table with a list of users excluded from licenses, a table with a source for each user license, a table that holds a waiting list for user licenses, or a combination thereof.

Figure 7:
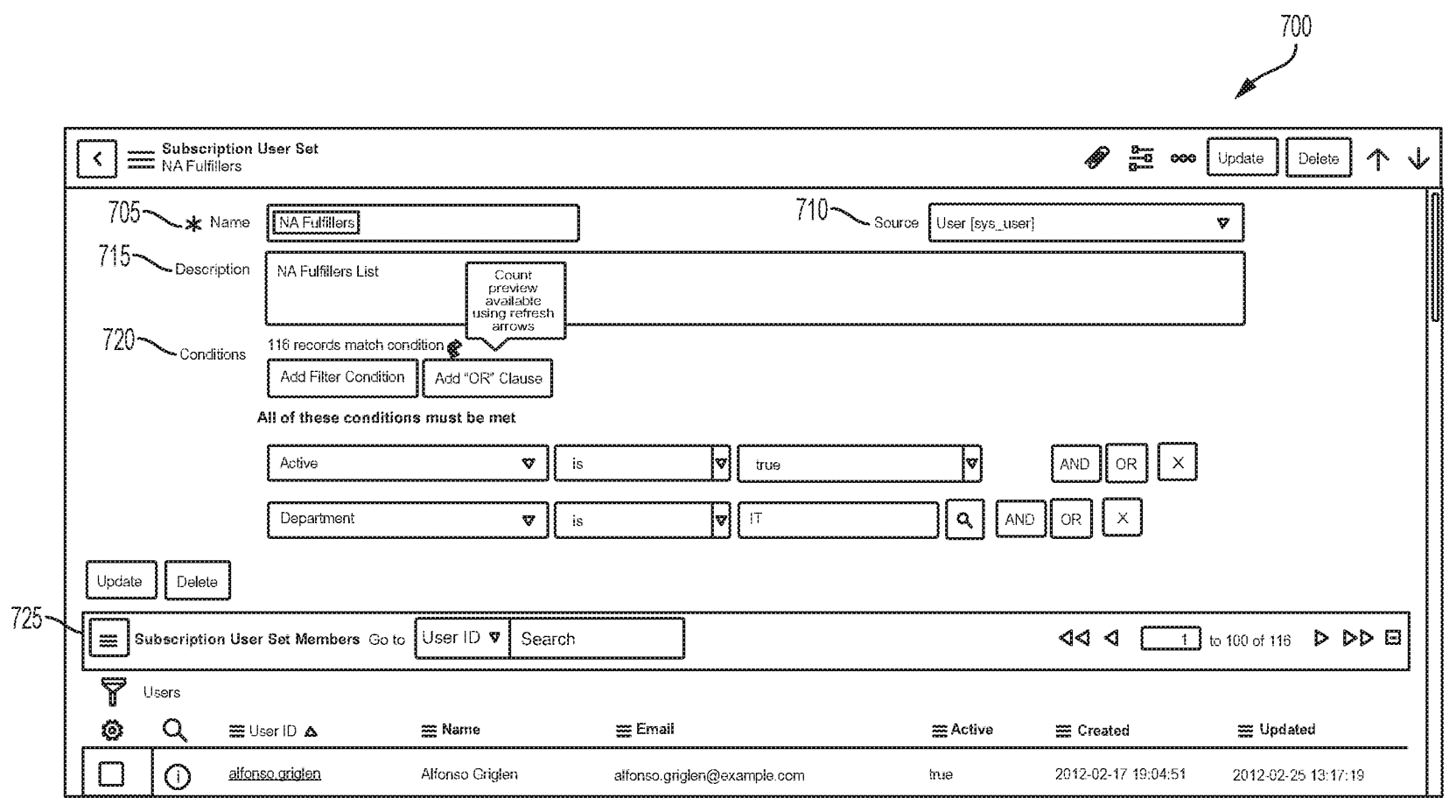

FIG. 7 is a screen shot illustrating a display 700 for creating a user set in accordance with implementations of this disclosure. The user sets can be organized within the tab 670 and associated data entry fields for displaying associated user sets of FIG. 6. For larger clients, user sets may be provided which allows distributed management of license candidates. A name 705 of a user set and its description 715 may be provided, along with a source 710 that the user set relates to. A user set may be either a filter condition 720 on a system user table or a group reference. In some implementations, only the filters are stored in a new table, and not the actual users themselves. The user sets can be used as a one-time seed or as a synced list of users to be allocated to one or more licenses. A count preview and set member list or preview 725 may be provided to evaluate a number of users matching a specified or current filter. Users can be in multiple user sets (and when removing sets, a user may be removed when all sets removed). User sets (if set to sync) may be synchronized periodically (e.g., hourly, predetermined, dynamically changing, etc.) or on demand, and this synchronizing allows for dynamically changing license allocations. User sets may be retained if they are associated with one or more licenses.

The above-configuration permits end users to see when they have one or more licenses to products from their user record, and details of the licenses can be viewed by selecting an element on the UI (e.g., the display 700). In some implementations, end users may not be shown as subscribed if they are in the pending category, i.e., waiting for a usage administrator to confirm inclusion by moving them into a license status.

FIG. 8 is a screen shot illustrating a display 800 for license status availability from user records in accordance with implementations of this disclosure. The license status availability or available status information from the user records may be displayed under a subscriptions tab and may include applications that the end user is entitled to use based on their licenses ("subscription application" field 805), and a related link to their licenses ("subscription" field 810) for each respective application. Display only licenses, which may be included to support legacy licensing models, may be provided to show customer ownership information, but not necessarily allocation.

Referring back to FIG. 5, and in some implementations, application usage (e.g., amount, number of users, etc.) can be monitored using a usage monitor module 592 and license purchase limits available for customers may permit enforcement and operation in an enforcement mode via the license enforcement module 570 by the usage administrator 590 or another operator. The usage monitor module 592 can include a reporting module or the reporting module can be a separate module of the licensing module 505. An option may be provided that enforces a limit on a per license basis. In this situation, when set on a license, usage administrators cannot add more users to the license beyond the displayed purchased amount. This enforcement can be enabled by selecting a UI element such as a checkbox (e.g., a checkbox that may be settable by administrators such as the usage administrator 590) to enforce the limit. In some implementations, users selected to receive the license or users that are in the process of moved from pending status may not be allocated to the license if the purchase limit would be exceeded. In some implementations, the checkbox can be set and un-set by the customer, and set only by administrators, but not usage administrators. For example, in some implementations, usage administrators can decide on policing level policy and usage administrators can be required to abide by that policy by the system.

Referring back to FIG. 4, store Applications such as the plug-in/component 415.3, which may be developed by third parties such as the third-party app owner/developer 450, but administered by a single-tenant cloud service provider and installed and executed on, for example, the instance 412.2, can also have their licenses enforced. However, in some implementations, the store application 415.3 use may not be blocked for non-subscribers by the third-party application owners/developers 450.

An option may be provided at application development time that blocks fulfillment operations in the application by non-subscribed users. A setting may be provided in the application configuration to enable enforcement in the License Management block. A platform access handler may gray out buttons (such as new, edit, update, save, delete, etc.) when attempting to edit a record belonging to another user (fulfillment) without a license from standard platform UI lists and records. Users accessing the application will then have record based fulfillment transactions blocked, and an error message may be displayed. For example, a record update may get blocked when: all licenses are downloaded to the production instance, the table is in a licensable package, the modifier is not the owner of the record, and the modifier is not subscribed to the application license or is not subscribed to a Platform Runtime license. However, not all actions need to be blocked (e.g., REST, SOAP). In some implementations, the blocked actions can be configurable. In some implementations, users may re-login after receiving a license if they have an active session before the entitlement takes effect.

For the store application (i.e., third-party application or plug-in/component) 415.3 enforcement, in some implementations, a default may be set to monitor application usage and provide report data. However, enforcement of the licensing may be provided as well, and an option may be provided at application development time (and at runtime, as described below) that blocks use of the application by non-subscribed users. Developers can have the ability to ignore table activity by, for example, unchecking a check box or deselecting an option, when determining fulfillment status, and developers can also determine described record ownership. The record ownership may be implemented, for example, as a filter condition. On each operation, the filter condition may be applied to the record change and, if a match occurs, the record belongs to the modifier and the operation is not a fulfillment (empty ownership conditions match and operations may not be considered a fulfillment). Tables can also be configured for enforcement by marking a table for fulfillment evaluation (or to ignore it), and to provide an owner condition (default for task based shown).

The system may permit a third-party application owner/developer (third-party developer) to selectively enable enforcement of licensing restrictions on a target instance after design time and deployment of the application to the instance via, for example, a switch associated with the application. For example, in some implementations, an interface can be provided for the developer on a management module (such as the management module 520 of FIG. 5), where the third-party developer can view instances and customers utilizing their third-party application. The third-party developer may in addition be given an interface to permit the developer to switch the licensing mode associated with an application from a monitoring mode to an enforcement mode for a particular instance or customer (such a switch may be performed by a central instance or a service provider as well). In some implementations, the enabling of enforcement can be placed on a timer to permit the owner of the instance time to comply with applicable licenses before enforcement occurs. The service provider, however, may be given the ability to override the enforcement action, such as when the enforcement is enabled remotely or if the enforcement is enabled at design time. For example, if the service provider fulfills orders placed through an app store (such as the app store 430 of FIG. 4) and an order or payment for additional licenses or rights might be delayed, the service provider can delay enforcement. In an alternative situation, the service provider may delay enforcement for other reasons, such as for customer satisfaction.

In some implementations, other types of applications can be enforced such as third-party or custom applications deployed through means other than a store and out-of-band applications that can be deployed by a service provider at a time other than when the service provider platform (such as the service provider 410 of FIG. 4) is updated.

Figure 9:
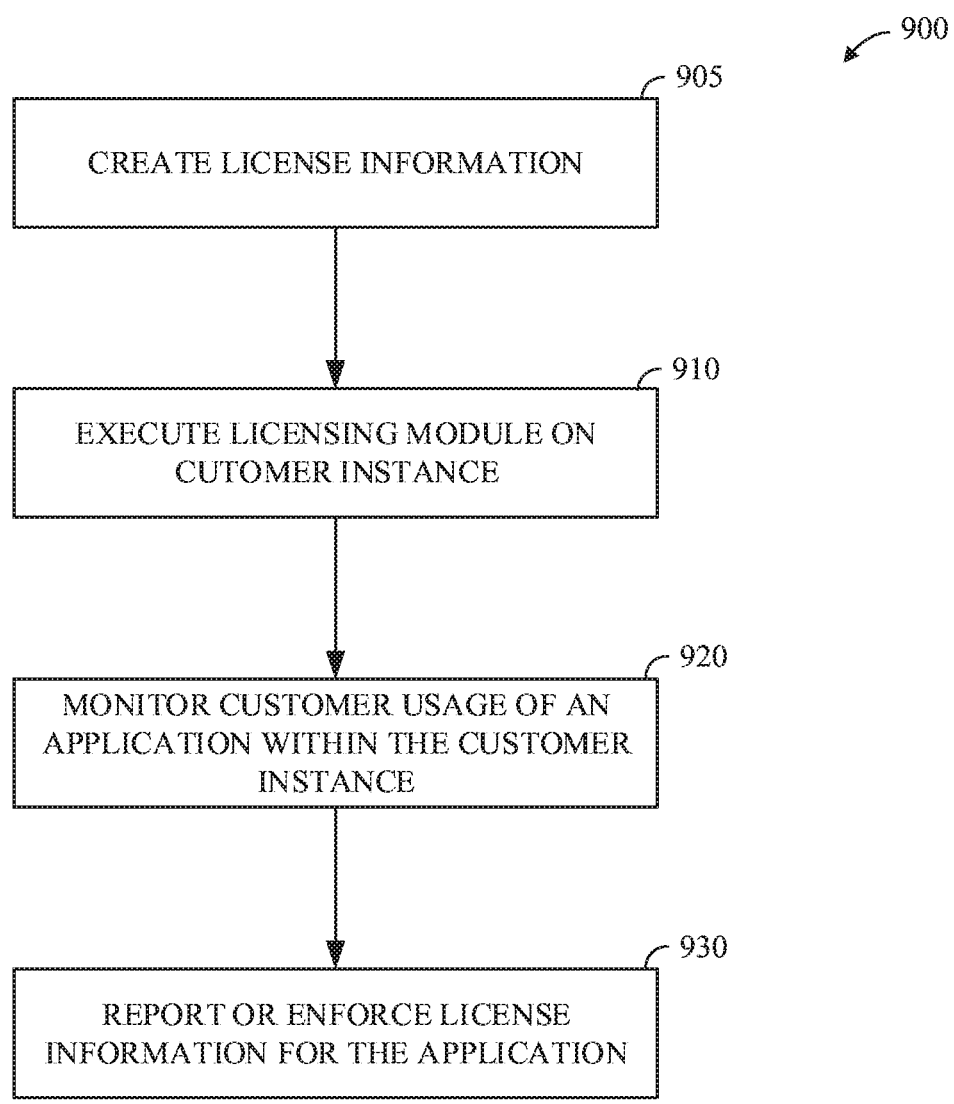
FIG. 9 is a flowchart of a technique for performing licensing monitoring and compliance within a service provider platform in accordance with implementations of this disclosure.

FIG. 9 is a flowchart illustrating a technique 900 for performing licensing monitoring and compliance within a service provider platform in accordance with implementations of this disclosure. Operation 905 can include creating a licensing database or license repository in a memory of the service provider platform (such as in the license/audit repository 550 of the central instance 412.0 of FIG. 5) comprising licensing information for a customer related to an application component (such as a third-party application component). Operation 910 can include running, on a processor of the service provider platform, executable code constituting a licensing module within a secure instance (e.g., a customer instance or the customer instance 412.1 of FIG. 5) that runs on the service provider platform. Operation 920 can include monitoring customer usage of the application component executing within the secure instance via the licensing module (e.g., by the usage monitor module 592 of the licensing module 505 of FIG. 5) by comparing the customer usage with the licensing information (e.g., licensing information stored within the central instance 412.0). Operation 930 can include performing an action by the licensing module selected from the group consisting of: 1) reporting customer usage relative to the licensing information; and 2) enforcing customer usage of the application component according to terms of the licensing information.

Figure 10:
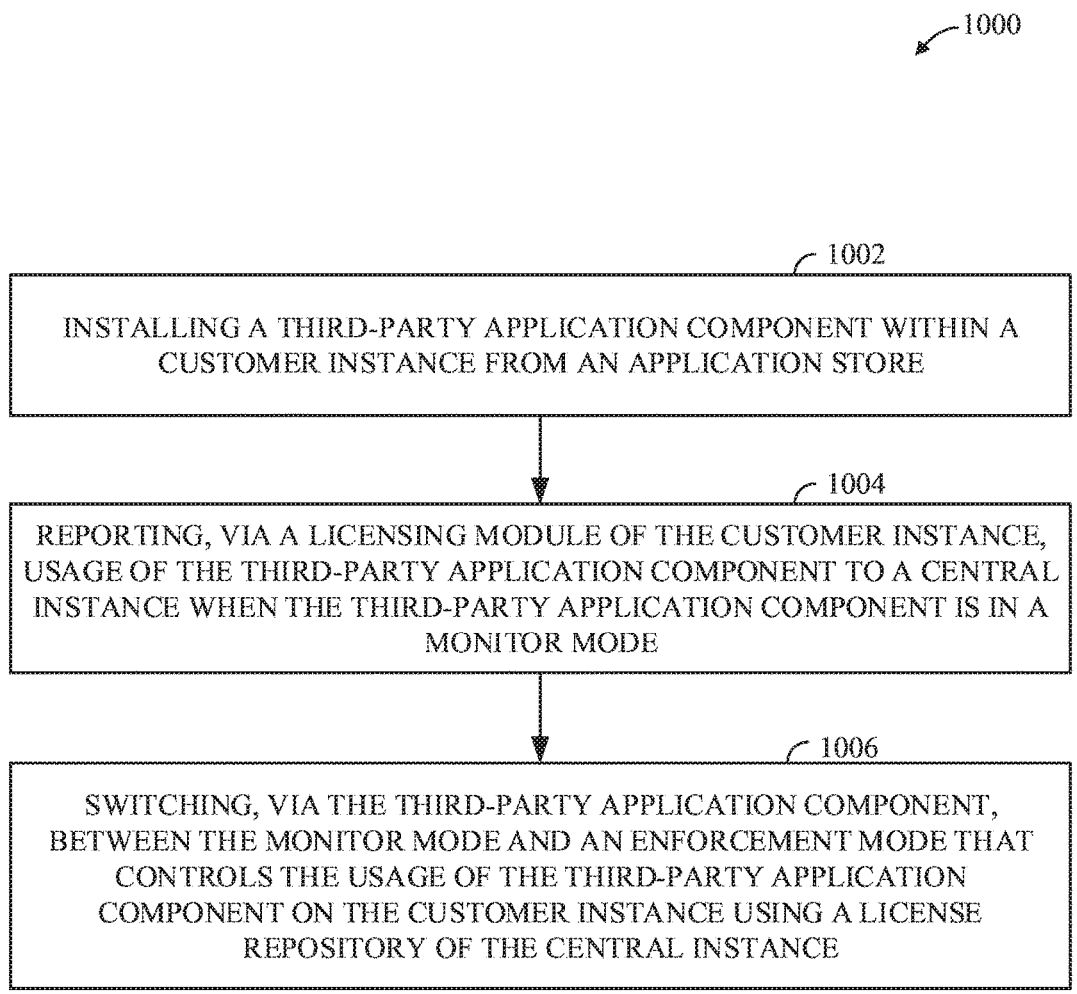
FIG. 10 is a flowchart of a technique for performing licensing monitoring and compliance within a service provider platform in accordance with implementations of this disclosure.

FIG. 10 is a flowchart illustrating a technique 1000 for performing licensing monitoring and compliance within a service provider platform in accordance with implementations of this disclosure. The method 1000 includes installing a third-party application component within a customer instance from an application store via step 1002; reporting, via a licensing module of the customer instance, usage of the third-party application component to a central instance when the third-party application component is in a monitor mode via step 1004; and switching, via the third-party application component, between the monitor mode and an enforcement mode that controls the usage of the third-party application component on the customer instance using a license repository of the central instance via step 1006. In some implementations, the third-party application component is switchable via the central instance or the service provider (cloud).

The method 1000 can include determining any of whether a license for the third-party application component is valid and whether the usage is in compliance with the license and dynamically modifying or adding policies associated with the usage. In addition, the method 1000 can include managing licensed users in dynamically configurable user sets and marking a user license as pending when an addition of the user license exceeds license limits.

Although the methods 900 and 1000 are shown as a series of operations for clarity, implementations of the methods 900 and 1000, or any other technique, process, method, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

Another implementation of this disclosure provides a system for performing licensing monitoring and compliance within a service provider platform. The system comprises a memory, a processor configured to execute instructions stored within the memory. The system includes a means for installing a third-party application component within a customer instance from an application store; a means for reporting usage of the third-party application component to a central instance when the third-party application component is in a monitor mode; and a means for switching between the monitor mode and an enforcement mode that controls the usage of the third-party application component on the customer instance using a license repository of the central instance.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for performing licensing monitoring and compliance within a service provider platform, the system comprising:
    a memory;
    a processor configured to execute instructions stored within the memory;
    a central instance that executes on the processor and comprises a license repository containing licensing data for application components; and
    a customer instance that executes on the processor and runs a third-party application component installed within the customer instance from an application store, wherein the third-party application component is switchable between a monitor mode and an enforcement mode, based on inputs provided via a developer interface, wherein, in the monitor mode and the enforcement mode, the third-party application component reports usage of the third-party application component to the central instance and, in the enforcement mode, the third-party application component disables functionality of the third-party application component on the customer instance based on a determination that the usage of the third-party application component exceeds usage permitted by the licensing data of the license repository.

2. The system of claim 1, wherein the developer interface is located on the central instance.

3. The system of claim 1, comprising a licensing module located on the customer instance, wherein the licensing module pushes the usage from the customer instance to the central instance.

4. The system of claim 3, wherein the licensing module provides information of the usage to a third-party developer associated with the third-party application component.

5. The system of claim 1, wherein the central instance further comprises:
    a license checker module that determines whether a license for the third-party application component is valid and whether the usage is in compliance with the license.

6. The system of claim 5, wherein policies associated with the usage are dynamically modifiable or addable.

7. The system of claim 1, wherein the customer instance further comprises:
    a license management module that manages licensed users in dynamically configurable user sets.

8. The system of claim 7, wherein the license management module marks a user license as pending when an addition of the user license exceeds license limits.

9. The system of claim 1, wherein a timer is provided that, in the enforcement mode, allows a period of time to elapse before the third-party application component disables the functionality of the third-party application component.

10. A method for performing licensing monitoring and compliance within a service provider platform, the method comprising:
    installing a third-party application component within a customer instance from an application store;
    reporting, via a licensing module of the customer instance, usage of the third-party application component to a central instance when the third-party application component is in either a monitor mode or an enforcement mode; and switching, based on inputs provided via a developer interface, the third-party application component between the monitor mode and the enforcement mode, wherein, in the enforcement mode, the third-party application component disables functionality of the third-party application component on the customer instance based on a determination that the usage of the third-party application component exceeds usage permitted by licensing data of a license repository located on the central instance.

11. The method of claim 10, wherein the developer interface is located on the central instance.

12. The method of claim 10, further comprising:
determining whether a license for the third-party application component is valid and whether the usage is in compliance with the license.

13. The method of claim 10, further comprising:
dynamically modifying or adding policies associated with the usage.

14. The method of claim 10, further comprising:
managing licensed users in dynamically configurable user sets.

15. The method of claim 10, further comprising:
marking a user license as pending when an addition of the user license exceeds license limits.

16. A non-transitory computer readable storage medium for performing licensing monitoring and compliance within a service provider platform, wherein the non-transitory computer readable storage medium includes executable instructions that, when executed by a processor, facilitate performance of operations, comprising:

installing a third-party application component within a customer instance from an application store;

reporting, via a licensing module of the customer instance, usage of the third-party application component to a central instance when the third-party application component is in either a monitor mode or an enforcement mode; and switching, based on inputs provided via a developer interface, the third-party application component between the monitor mode and the enforcement mode, wherein, in the enforcement mode, the third-party application component disables functionality of the third-party application component on the customer instance based on a determination that the usage of the third-party application component exceeds usage permitted by licensing data of a license repository located on the central instance.

17. The non-transitory computer readable storage medium of claim 16, wherein the operations further comprise:
determining whether a license for the third-party application component is valid and whether the usage is in compliance with the license.

18. The non-transitory computer readable storage medium of claim 16, wherein the operations further comprise:
dynamically modifying or adding policies associated with the usage.

19. The non-transitory computer readable storage medium of claim 16, wherein the operations further comprise:
managing licensed users in dynamically configurable user sets.

20. The non-transitory computer readable storage medium of claim 16, wherein the operations further comprise:
marking a user license as pending when an addition of the user license exceeds license limits.

* * * * *